Aug. 30, 1949.  A. A. BJORK  2,480,353
CARRIER APPLIED TO CAR TOPS
Filed April 24, 1947
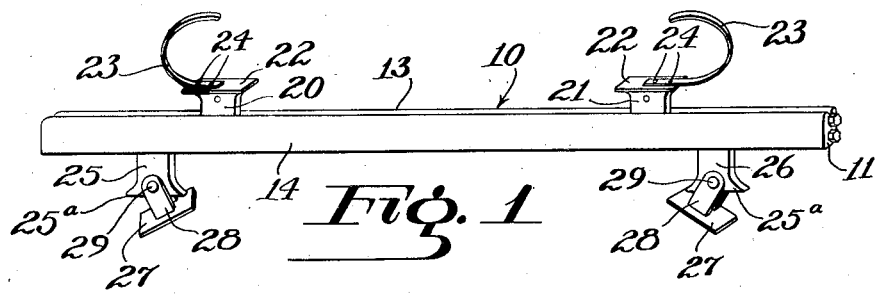
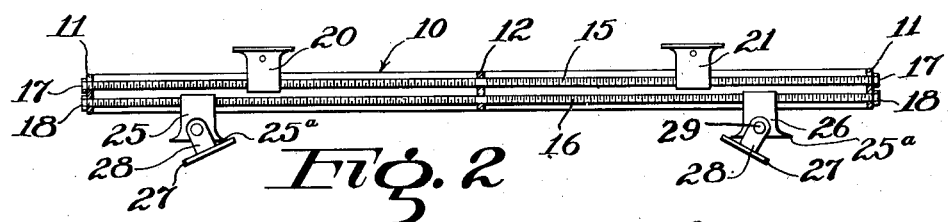
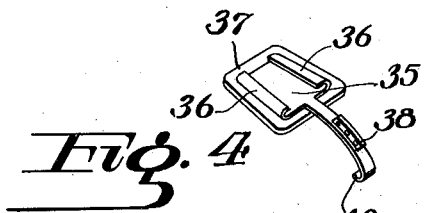
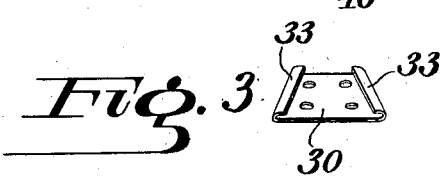
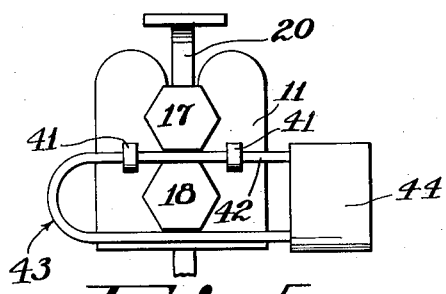
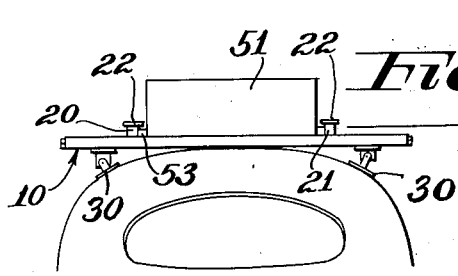
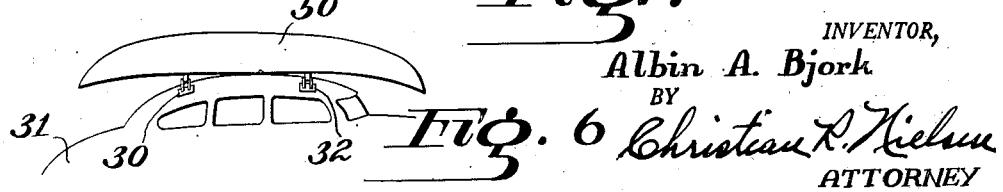
INVENTOR,
Albin A. Bjork
BY
Christian R. Nielsen
ATTORNEY Patented Aug. 30, 1949

2,480,353

UNITED STATES PATENT OFFICE 2,480,353

CARRIER APPLIED TO CAR TOPS

Albin A. Bjork, Ashland, Wis.

Application April 24, 1947, Serial No. 743,508

4 Claims. (Cl. 224—42.1)

This invention relates to carries for articles supported on the tops of automobiles. An object of the invention is the provision of an article carrier that may be removed or applied readily to the top of an automobile, said carrier including adjustable clamps for retaining the article in place.

Another object of the invention is the provision of an article carrier that is applied to the top of an automobile, said carrier when not in use being readily removable, said carrier including pairs of clamping members which are moved toward each other for gripping an article by screws, said screws being locked against unauthorized manipulation.

A further object of the invention is the provision of an article carrier that is applied removably to the top of an automobile, said carrier including spaced plates having tapered and flanged side edges for the reception of tapered feet swingable from bars supporting adjustable clamps that grip an object firmly, said plates being bolted or riveted to the top of the automobile or removably attached thereto, means being employed for preventing unauthorized release of the clamps.

The invention consists in the novel construction, arrangement and combination of parts hereinafter more particularly described and claimed.

In the drawings:

Figure 1 is a longitudinal perspective view of one of the main elements of a carrier.

Figure 2 is a longitudinal vertical section of the element illustrated in Figure 1 and showing article holding clamps and the operating means therefor.

Figure 3 is a perspective view of a removable device for retaining the supporting feet of the carrier in place.

Figure 4 is a view in perspective of a modified form of the attaching plate shown in Figure 3.

Figure 5 is an end view of the carrier element.

Figure 6 is a fragmentary side view of an automobile showing a canoe held in place on the top of the automobile by my improved carrier.

Figure 7 is a rear view of the automobile with the carrier applied for holding the canoe, with the canoe shown in transverse section, and Figure 8 is a fragmentary rear view of an automobile, with the carrier applied to the top for supporting a box.

Referring more particularly to the drawings, 10 designates an elongated casing having the top and bottom open to provide longitudinal slots. The ends of the casing are closed by a plate 11. An intermediate plate 12 is connected between side walls 13 and 14 of the casing. Screws 15 and 16 have intermediate bearings in the plate 12 and end bearings in the plate 11. The screws at one side of the plate 12 are left-hand while the screws at the other side are right-hand. The screw 15 has a hexagonal head 17 at each end while the screw 16 has a head 18 at each end.

A clamp 20 is provided with an internally threaded passage which is received by one section of the screw 15 while a clamp 21 has a threaded passage which is received by the other section of said screw. Each clamp has a flange 22 at the top thereof and said flanges extend beyond the confines of said clamp to provide fingers for a purpose which will be presently explained. A strap 23 has one end bolted at 24 to each flange.

A cross-head 25 has an internally threaded passage which is received by one section of the screw 16 at one side of the plate 12 while a crosshead 26 has an internally threaded passage received by the other section of said screw. A tapered foot 27 has a pair of spaced arms 28 pivoted at 29 on the free end of the cross heads 25.

Two spaced plates 30 are bolted or riveted to the rear end of the top 31 of an automobile while two spaced plates 32 are bolted or riveted to the front end of the top of the automobile. Each plate is tapered with the narrow ends facing each other in the pairs of plates at each end of the automobile. The side edges of each plate are inclined toward each other and provided with a flange 33 which overhangs the plate to receive the tapered foot 27.

A modified form of the fastening plate is shown in Figure 4. The plate 35 is also tapered and provided with inturned flanges 36. The underface of each plate has sealed thereto a rubber mat 37 to protect the top of the automobile. A strap 38 is formed integrally with the plate and extends outwardly therefrom. The free end of the strap is provided with a hook 40 which is adapted to engage a projecting portion on the side edge of the top of the automobile. Thus the plates 35 are readily removable from the top.

Bearings 41 are formed on the outer face of one of the plates 11 for receiving one leg 42 of a bail 43 of a pad lock 44. The leg 42 when received by the bearings 41 is located between heads 17 and 18 on the screws 15 and 16 and sufficiently close thereto so that said heads and screws cannot be rotated, thereby preventing unauthorized manipulation of said screws.

When the plates 30 (Fig. 3) are fixed in place in pairs on the top of the automobile, the feet 27 are positioned in said plates so that the side edges of the feet will be received by the inturned flanges 33 with the members 10 disposed transversely at the front and rear of the top. The screw 16 is then rotated in the proper direction by applying a crank to one of the heads 18 until the feet 27 have become firmly wedged in the plates 30. Thus the casings 10 which are in effect load supporting bars are firmly secured in place.

It will be noted from Figures 1 and 2, that the lower free ends of the crossheads 25 and 26 have oppositely disposed toes 25—a. The inner toes are adapted to engage the feet 27 when said feet are drawn up tight in the plates for stabilizing the members 10.

The boat, canoe 50 or packing box 51 is placed on the members 10, lengthwise of the automobile so that the fingers 22 will engage over a projection 53 on the box or crate 51. The projection or rib 52 may be at the inner or outer face of the boat 50 while in the case of the article 51 the cleat or projection 53 is mounted on the outer surface. The screw is then rotated by means of a crank applied to one of the heads 17 until the clamps 20 and 21 have been moved sufficiently toward or away from each other to effectively grip the load between them on the bars 10.

When the load has been firmly secured in place, the padlock is applied to one end of each bar 19 as shown in Figure 5. The leg 42 of the bail of the lock disposed between the heads 17 and 18 will prevent the application of a socket on a wrench or crank to said heads and thus prevent unauthorized manipulation of the screws 15 and 16 for the removal of the load.

The straps 23 may be removed when deemed unnecessary to retain the load in place since the hooks are bolted to the tops of the clamps. However, when employed, the hooks will engage over the load at opposite sides thereof and will aid in retaining said load in place. It is to be borne in mind that the fingers 22 and the clamps not only secure the load in place but prevent unauthorized release of said load.

The removable fastening plates 35 may be employed instead of the fixed plates 30. The hooks 40 on the ends of the straps 38 are engaged over a projection at each side of the automobile. After the padded plates 35 are disposed in pairs on the top of the automobile a foot 27 is placed in each plate and the screw 16 is properly rotated to not only draw the feet up tight in said plates but to draw the straps taut on the top of the vehicle for retaining the hooks 40 in firm engagement with the projections on said top.

I claim:

1. A luggage carrier for vehicle tops comprising a pair of load supporting casings, a screw mounted in bearings in the casing and provided with right and left-hand threads, a crosshead having an internally threaded passage received by the right-hand threads, a second crosshead having an internally threaded passage received by the left-hand threads so that when the screw is rotated the crossheads will be moved toward or away from each other, fastening plates mounted in pairs on the top of a vehicle at the front and rear thereof, said plates being tapered and provided with flanges at the sides thereof, a tapered foot projecting from each crosshead and received by the flanges of a plate, said feet being drawn toward each other when the screw is rotated in one direction for securing the casing on the vehicle top, and means attaching the load on the casings.

2. A luggage carrier for vehicle tops comprising a pair of load supporting casings, a screw mounted in bearings in the casing and provided with right and left hand threads, a crosshead having an internally threaded passage received by the right-hand threads, a second crosshead having an internally threaded passage received by the left-hand threads so that when the screw is rotated the crossheads will be moved toward or away from each other, means for locking said screw against unauthorized rotation, fastening plates mounted in pairs on the top of a vehicle at the front and rear thereof, said plates being tapered and provided with flanges at the sides thereof, a tapered foot projecting from each crosshead and received by the flanges of a plate, said feet being drawn toward each other when the screw is rotated in one direction for securing the casing on the vehicle top, and means attaching the load on the casing.

3. A luggage carrier for vehicle tops comprising a pair of load-supporting casings arranged in spaced relation transversely on the top, a pair of screws mounted in bearings in the casings, each screw having spaced right and left-hand threads, a clamp on each of the threads of one screw and provided with a threaded passage to receive the screw so that when said screw is rotated the clamps will move toward each other for gripping a load therebetween, a crosshead on each of the left and right-hand threads of the other screw and provided with a threaded passage receiving said screw, a foot swingable from each cross-head, and a fastening plate for each foot having a wedging means to receive the foot, the second screw when rotated in one direction causing the feet in pairs to be moved toward each other into fixed relation with the wedging means for retaining the casings on the vehicle top.

4. A luggage carrier for vehicle tops comprising a pair of load-supporting casings arranged in spaced relation transversely on the top, a pair of screws mounted in bearings in the casings, each screw having spaced right and left-hand threads, a clamp on each of the threads of one screw and provided with a threaded passage to receive the screw so that when said screw is rotated the clamps will move toward each other for gripping a load therebetween, a crosshead on each of the left and right-hand threads of the other screw and provided with a threaded passage receiving said screw, a foot swingable from each crosshead, a fastening plate for each foot having a wedging means to receive the foot the second screw when rotated in one direction causing the feet in pairs to be moved toward each other into fixed relation with the wedging means for retaining the casings on the vehicle top, each screw having a head adapted to be engaged by a suitable tool for rotating the screws, and a lock carried by an end of each casing having a bail, each bail having a leg disposed between each pair of the heads to prevent unauthorized rotation of the screws.

ALBIN A. BJORK.

REFERENCES CITED

The following references are of record in the file of this patent:

UNITED STATES PATENTS

| Number | Name | Date |
| --- | --- | --- |
| 1,635,907 | Rummer | July 12, 1927 |
| 1,826,470 | Hutchinson | Oct. 6, 1931 |